United States Patent [19]

Foster

[11] Patent Number: 5,970,692
[45] Date of Patent: Oct. 26, 1999

[54] CLEARING APPARATUS AND CARRIAGE FOR A CLEARING DEVICE

[76] Inventor: Thomas E. Foster, 2200 Cerca Viejo Way, Austin, Tex. 78746

[21] Appl. No.: 08/944,145

[22] Filed: Oct. 6, 1997

[51] Int. Cl.[6] .............................. A01D 75/10; A01D 34/67
[52] U.S. Cl. .............................. 56/12.1; 56/12.7; 56/16.7; 56/12.8
[58] Field of Search .................... 56/12.1, 12.7, 56/16.7, 12.8, 16.9, 17.5, 202, 400, 14, 17.2, 473.5, DIG. 18; 30/276

[56] References Cited

U.S. PATENT DOCUMENTS

| | | | |
|---|---|---|---|
| 2,638,730 | 5/1953 | Davidson | 56/400.14 |
| 3,221,481 | 12/1965 | Mattson et al. | 56/25.4 |
| 3,788,049 | 1/1974 | Ehrlich | 56/16.9 |
| 3,977,078 | 8/1976 | Pittinger, Jr. | 30/276 |
| 4,009,560 | 3/1977 | Wells | 56/400.01 |
| 4,182,100 | 1/1980 | Letter | 56/16.7 |
| 4,224,784 | 9/1980 | Hansen et al. | 56/16.9 |
| 4,358,123 | 11/1982 | Richards | 280/47.13 R |
| 4,442,659 | 4/1984 | Enbusk | 56/12.7 |
| 4,512,143 | 4/1985 | Jimenez | 56/16.7 |
| 4,587,800 | 5/1986 | Jimenez | 56/16.9 |
| 4,624,321 | 11/1986 | Pinto | 172/15 |
| 4,679,385 | 7/1987 | Carmine | 56/16.9 |
| 4,688,376 | 8/1987 | Wolfe, Sr. | 56/16.7 |
| 4,703,613 | 11/1987 | Raymond | 56/12.7 |
| 4,704,849 | 11/1987 | Gilbert et al. | 56/17.5 |
| 4,712,363 | 12/1987 | Claborn | 56/16.7 |
| 4,756,147 | 7/1988 | Savell | 56/16.7 |
| 4,796,415 | 1/1989 | Moore | 56/16.9 |
| 4,802,327 | 2/1989 | Roberts | 56/15.2 |
| 4,829,755 | 5/1989 | Nance | 56/17.1 |
| 4,845,929 | 7/1989 | Kawasaki et al. | 56/17.5 |
| 4,891,931 | 1/1990 | Holland | 56/16.7 |
| 4,914,899 | 4/1990 | Carmine | 56/16.7 |
| 4,922,694 | 5/1990 | Emoto | 56/16.7 |
| 4,936,886 | 6/1990 | Quillen | 56/16.7 |
| 4,953,294 | 9/1990 | Dohse | 30/276 |
| 4,981,012 | 1/1991 | Claborn | 56/16.9 |
| 5,279,102 | 1/1994 | Foster | 56/12.7 |
| 5,408,816 | 4/1995 | Cartier | 56/17.5 |
| 5,603,205 | 2/1997 | Foster | 56/16.7 |
| 5,613,354 | 3/1997 | Foster | 56/16.7 |

FOREIGN PATENT DOCUMENTS

WO 93/17547   9/1993   WIPO .................... 56/12.1

OTHER PUBLICATIONS

Inertia Dynamics Corporation, "Inertia Dynamics Corporation Owner's Manual for Model Nos. 500 and 530", pp. 1–16, Jun. 1991.

*Primary Examiner*—H. Shackelford
*Attorney, Agent, or Firm*—Willem G. Schuurman; Vinson & Elkins L.L.P.

[57] ABSTRACT

A clearing apparatus which includes a clearing device for use in clearing operations, and a carriage for supporting a clearing device during use. The clearing device is a clearing device of any conventional type and includes an elongated support member, a power unit at one end of the support member and a clearing head at the other end of the support member. The carriage comprises a frame structure having a lower end portion and having an upper end portion to extend upwardly from the lower end portion during use of the apparatus, a single support wheel having a wheel axis about which the support wheel is rotatably mounted to the lower end portion of the frame strut to support the frame strut on a support surface during use, a pivot mount intermediate the lower and upper end portions of the frame strut mounting the support member of the clearing device to the frame strut to allow the clearing head to be displaced laterally relative to the wheel plane, and a guide handle extending from the upper end portion of the frame strut for use in guiding the support wheel during use.

44 Claims, 4 Drawing Sheets

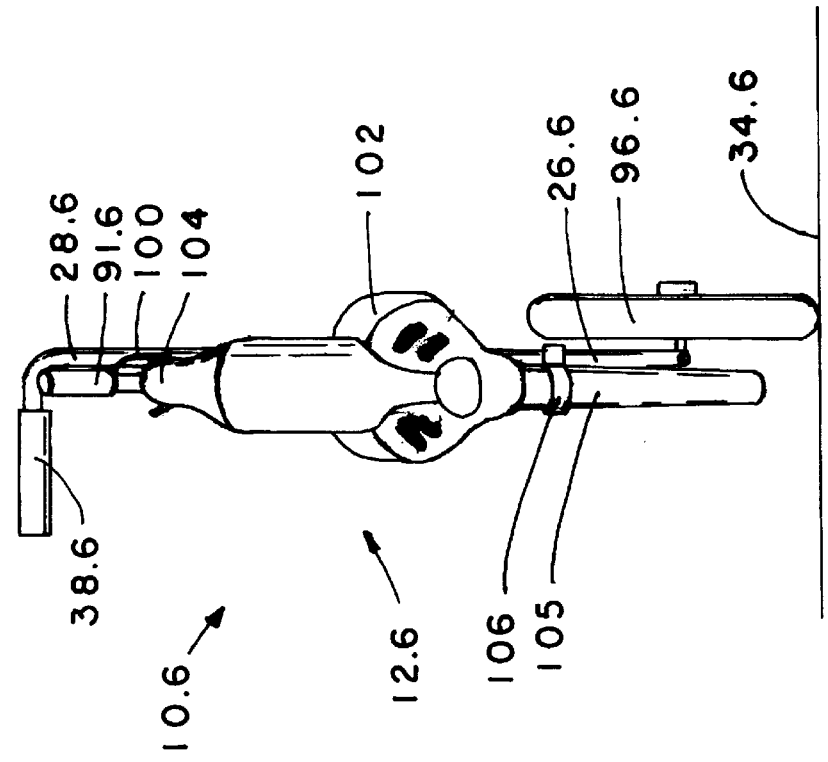
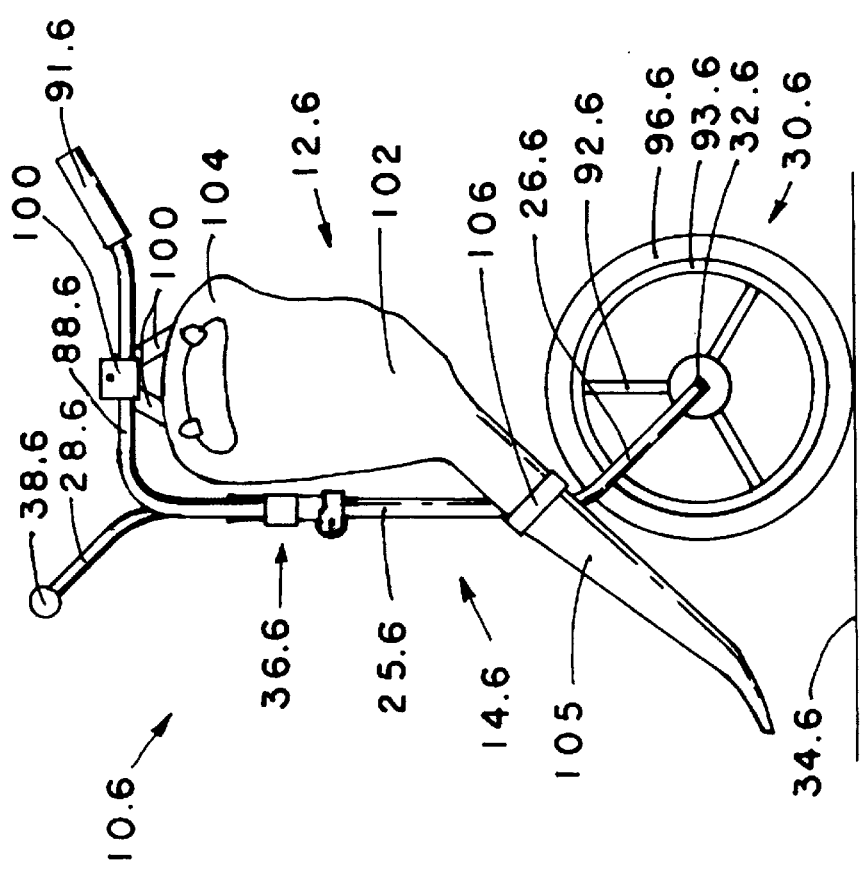

CLEARING APPARATUS AND CARRIAGE FOR A CLEARING DEVICE

BACKGROUND OF THE INVENTION

This invention relates to a clearing apparatus for use in clearing operations. The invention further relates to a carriage for use in supporting a clearing device.

The clearing apparatus of this invention is, in one aspect, in the form of a trimmer apparatus. The clearing apparatus is, in another aspect, in the form of a blower apparatus. The clearing apparatus is, in other aspects of the invention, in the form of a vacuum apparatus, in the form of a cultivator apparatus, in the form of a power broom, in the form of a snow blower, or snow thrower, or the like. The clearing apparatus may also, in another aspect, be convertible between the various aspects of the invention.

Where the clearing apparatus of this invention is in the form of a trimmer apparatus, it has particular application in the cutting of vegetation in the form of grass, weeds, shrubs, brush and the like. The trimmer apparatus has particular application in regard to a trimmer or cutter of the type which uses a cutting line for cutting or trimming vegetation. The trimmer apparatus can, however, also have application in regard to a trimmer which uses a cutter blade or various types of cutter blades for cutting or trimming vegetation, wood or other objects. The cutter blade may conveniently be in the form of a circular or annular blade or blade system. It may also, for example, be in the form of a reciprocating blade or blade system.

Where the clearing apparatus of this invention is in the form of a blower apparatus or a vacuum apparatus, it may have application in clearing indoors or outdoors areas of dust, debris, leaves, etc.

Where the clearing apparatus of this invention is in the form of a cultivator apparatus, it may have rotatably driven cultivator blades of any conventional type for use in cultivating soil. Where the clearing apparatus of this invention is in the form of a power broom, it may have a rotatably driven broom of any of suitable or conventional type for use in clearing areas. Where the clearing apparatus of this invention is in the form of a snow blower or snow thrower, it may have a snow handling system of any suitable or conventional type for use in clearing or blowing snow.

Applicant is aware of a number of prior patents which disclose various forms of wheeled carriages for supporting trimmers. These patents include U.S. Pat. No. 3,221,481—Mattson et al.; U.S. Pat. No. 4,845,929—Saki et al.; U.S. Pat. No. 3,977,078—Pittenjar; U.S. Pat. No. 4,936,886—Quillen; U.S. Pat. No. 4,182,100—Litter; U.S. Pat. No. 4,891,931—Holland; U.S. Pat. No. 4,442,659—Enbusk; U.S. Pat. No. 4,981,012—Claiborne; U.S. Pat. No. 4,829,755—Nance; and U.S. Pat. No. 5,408,816—Cartier. These patents do, for the most part, present a number of disadvantages.

Some of these disadvantages are that the operator has to support a major portion of the weight of the apparatus; that the apparatus is not supported near its center of gravity; that the apparatus is designed to be operated lawn-mower fashion so that lateral maneuverability of the apparatus is limited; that the operator can not position himself near the center of gravity of the apparatus during use; that the apparatus can not readily traverse obstacles during use; that the apparatus is bulky and difficult to handle, and that the apparatus restricts the reach of the clearing head of the apparatus during use.

Applicant is also the patentee of U.S. Pat. No. 5,279,102 which issued Jan. 18, 1994.

Applicant's prior patent relates to a clearing apparatus and to a carriage for a clearing apparatus which can reduce or overcome one or more of the disadvantages presented by the prior patents discussed above, and by the prior patents and the publication made of record during prosecution of Applicant's U.S. Pat. No. 5,279,102.

Applicant is also the patentee of U.S. Pat. No. 5,613,354 which issued Mar. 25, 1997, and of U.S. Pat. No. 5,603,205 which issued Feb. 19, 1997.

These two prior patents relate to a clearing apparatus and a carriage for clearing apparatus, and to a trimmer and edger apparatus respectively. These two prior patents relate to certain additions, modifications, changes, developments and/or improvements in or relating to aspects of a clearing apparatus and a carriage for a clearing apparatus of the general type described in Applicant's prior U.S. Pat. No. 5,279,102.

Applicant's present invention relates to certain changes, modifications, additions, developments and/or improvements relating to the general types of apparatus forming the subject matter of applicant's prior patents.

Applicant hereby refers to and makes of record all art of record in applicant's prior U.S. Pat. Nos. 5,279,102, 5,613,354 and 5,603,205.

It is one of the objects of this invention to provide a clearing apparatus, and to provide a carriage for a clearing device, which can reduce or overcome one or more of the disadvantages of the prior art.

It is a further object of this invention to provide a clearing apparatus and a carriage for a clearing device which are easy to use and are easy and convenient to handle.

SUMMARY OF THE INVENTION

In accordance with one aspect of the invention, there is provided a clearing apparatus comprising a clearing device for use in clearing operations, and a carriage to which the clearing device is mounted for the carriage to support the clearing device during use; the clearing device comprising an elongated support member, a clearing head mounted at a leading end of the support member, a power unit mounted at a trailing end of the support member, and a drive connection for connecting the power unit to the clearing head; the carriage comprising a frame strut having a lower end portion and having an upper end portion to extend upwardly from the lower end portion during use of the apparatus, a single support wheel having a wheel axis about which the support wheel is rotatably mounted to the lower end portion of the frame strut to support the frame strut on a support surface during use, a pivot mount intermediate the lower and upper end portions of the frame strut mounting the support member of the clearing device to the frame strut, and a guide handle extending from the upper end portion of the frame strut for use in guiding the support wheel during use; the pivot mount having a pivot axis to extend substantially vertically during use to allow the elongated support member of the clearing device to be pivotally displaced for varying the angle between a clearing device plane and the support wheel plane during use, the clearing device plane being a plane which extends through the elongated axis of the elongated support member and which extends substantially vertically during use; the guide handle being positioned for an operator grasping the guide handle for guiding the support wheel during use, to be positioned to one side of the support wheel and at least partially in line with part of an axial projection of the support wheel during normal use; the frame strut being shaped so that the pivot mount and the guide handle will be in advance of the wheel axis during use, and so that the guide handle, the pivot axis and the contact point of the support wheel with a support surface during use, will be generally in line during use; and the clearing device being mounted to the frame strut such that the clearing apparatus will be supported proximate its center of gravity on the support wheel when the support wheel and the elongated support member are generally in line with each other during normal use.

The drive connection may be a drive connection of any conventional or suitable type for operatively connecting the power unit to the clearing head. Thus, for example, the drive connection may be in the form of a drive shaft, a flexible drive shaft, a power connection such as an electrical connection, or the like depending upon the type of power unit and the type of clearing head.

In one embodiment of the invention, the pivot mount may be pivotally mounted on the frame strut to be pivotally displaceable about the frame strut for pivotally displacing the elongated support member relatively to the support wheel plane during use.

In an alternative embodiment of the invention, the pivot mount may include a pivot section which is pivotally connected to the pivot mount so that the elongated support member can be attached to the pivot section for pivotally displacing the elongated support member relatively to the support wheel plane during use.

The pivot mount may be displaceable along the frame strut intermediate the upper and lower end portions for adjusting the height at which the clearing device is supported on the frame strut during use.

The apparatus may include any suitable height adjustment clamp for locking the pivot mount in a desired position along the frame strut. Thus, for example, the apparatus may include a height adjustment clamp which pivotally engages the pivot mount and which clamps onto the frame strut.

In one embodiment of the invention, the lower portion of the frame strut may be angled or shaped relatively to the intermediate portion of the frame strut so that the support wheel operates as a castor wheel during use. Thus, for example, the lower portion of the frame may be smoothly curved in the trailing direction to provide a castor effect. In an alternative example of the invention, the frame strut may have an angled trailing portion extending in the trailing direction to provide the castor effect.

In one preferred embodiment of the invention, the pivot mount may have a swivel connection connecting the elongated support member to the pivot mount to allow the elongated support member to be swiveled about its elongated axis for different clearing operations. Thus, the elongated support member may be swiveled about its elongated axis to place the clearing head in different orientations to perform, for example, conventional trimming operations, edging operations, angled cutting operations, or the like depending on the type of clearing head.

The swivel connection may allow the elongated support member to be swiveled about its elongated axis and located in a predetermined limited number of orientations or to be located in any desired orientation. In this latter embodiment of the invention, the swivel connection may be provided by a pair of swivel clamps which are clamped together to lock the elongated support member between them in a desired orientation.

At least one of the swivel clamps may preferably have a generally V-shaped groove to define inclined surfaces for engaging with the outer surface of a typical elongated support member during use. This provides the advantage that the angled surfaces of the V-shaped groove can accommodate elongated support members of differing diameters and differing cross-sections while also providing the ability to give a firm locking engagement between the swivel clamps and such an elongated support member during use. Preferably both swivel clamps will each have a generally V-shaped groove to accommodate elongated support members of differing cross-sections and differing diameters.

Conventional clearing devices generally provide a degree of vibration which can be irritating or uncomfortable to the user. It is therefore advantageous to provide vibration attenuation mounts to attenuate some of the vibration from typical clearing devices. The vibration attenuation mounts may be provided in any convenient position in the clearing apparatus. Thus, for example, the vibration attenuation mounts may be provided between the clearing device and the frame strut, between the clearing device and the pivot mount, in the guide handle, or at any other convenient location.

In a presently preferred embodiment of the invention, the swivel clamps may include vibration attenuation mounts to attenuate the vibration between the clearing device and the frame strut during use. These vibration attenuation mounts may be in the form of a resiliently compressible sleeve, resiliently compressible pads, shock absorbing pads, or the like.

Various types of clearing devices, particularly hand-held clearing devices, are well known and are provided by a variety of different companies. For example, clearing devices in the form of trimmers are provided by companies such as Ryobi, Echo, John Deere and others. The clearing devices sometimes have elongated support members which extend at slightly differing angles to the cutting plane of the clearing head. It is therefore preferable to have the pivot mount such that it can mount the elongated support members of a variety of different clearing devices at appropriate angles so that the clearing heads will be at the correct angles for easy and effective use.

Applicant has found that the vast majority of clearing devices in the form of trimmers need to have their elongated support members extending at an angle of between about 28° and about 40° to the horizontal during use for effective positioning of the clearing head. The pivot mount of this invention is therefore preferably designed to mount the elongated support member to extend at an angle of between about 28° and about 40° to the horizontal during use. In a presently preferred embodiment, the pivot mount mounts the elongated support member to extend at an angle of about 35° to the horizontal during use. In this presently preferred embodiment, virtually all available clearing devices in the form of trimmers that Applicant is aware of, can be mounted in the clearing apparatus to provide the clearing head at an effective orientation for easy and effective use.

It will be appreciated, however, that the pivot mount may be adapted to mount an elongated support member at a different angle from that indicated above, if a particular clearing device dictates a different angle.

In the clearing apparatus of this invention, the frame strut is preferably shaped so that a line extending from the guide handle to the contact point of the support wheel and a support surface during use, will extend at a forward or lead angle to the vertical during normal use.

This arrangement provides the advantage that the wheel axle will trail the pivot axis of the pivot mount during use, thereby making it easier to use the clearing apparatus and making it easier for the wheel to follow the intended direction of movement.

In a presently preferred embodiment, the frame strut is shaped so that a line extending from the guide handle to the contact point of the support wheel and a support surface during use, extends at a lead angle of between about 15° and about 25° to the vertical during normal use. More preferably, the lead angle may be about 20° to the vertical during normal use.

In one presently preferred embodiment of the invention, the frame strut may be shaped so that the guide handle, the pivot axis and the contact point of the support wheel with a support surface during use, will be substantially in line during normal use.

The guide handle may extend at any desired convenient angle to the upper end portion of the frame strut for ease of handling and control of the clearing apparatus.

In a presently preferred embodiment, the guide handle may extend from the upper end portion of the frame strut so that the guide handle and the wheel axis are substantially or generally parallel. Applicant has found that this arrangement provides a particularly convenient orientation of the guide handle so that it can be grasped, typically in the left hand, and can be used to control and advance the clearing apparatus for use.

The guide handle is preferably positioned for an operator grasping the guide handle for guiding the support wheel during use to be positioned generally in line with or substantially in line with the axial projection of the support wheel during normal use. Conveniently, the guide handle may be positioned so that an operator grasping the guide handle for guiding the support wheel during use will be positioned substantially in line or generally in line with the axis of the support wheel during normal use. This arrangement provides the advantage that the operator can readily traverse areas to be cleared and can move not only the clearing apparatus, but the clearing head for maximum effect.

The clearing apparatus of this invention includes a control handle for use in controlling the clearing device. The control handle may be conveniently provided on the clearing device on the trailing side of the center of gravity of the clearing apparatus during use.

The control handle may preferably include a throttle or control switch for controlling the power unit.

The control handle may preferably be the control handle which is conventionally provided on clearing devices by the manufacturers of such devices. Such control handles are typically provided on the elongated support member near the power unit. The control handle preferably includes vibration attenuation sleeves or mounts in the control handle to attenuate vibration generated by the clearing device during use.

In a preferred embodiment of the invention, the guide handle and control handle are positioned so that an operator grasping the handles for use of the apparatus will be positioned proximate the center of gravity of the apparatus during normal use. The operator will also be positioned at or proximate the support wheel during use. An operator would therefore typically grasp the guide handle with his or her left hand and the control handle with his or her right hand to guide the apparatus by means of the left hand and control the clearing head of the clearing device by means of the right hand. Obviously, during use, the clearing apparatus will be guided by both hands of the operator and, in practice, the apparatus generally tends to be used with limited lateral movement of the clearing head relatively to the wheel plane. In other words, they tend to be used mainly as a unit.

The pivot mount may include a pivot drag adjustment for adjusting the degree of drag about its pivot axis. The pivot drag adjustment may be an adjustment mechanism of any conventional or suitable type which may be adjusted to adjust the ease with which the elongated support member can be pivotally displaced about the pivot axis during use.

In one embodiment of the invention the pivot drag adjustment may include a friction pad which may be adjusted to adjust the degree of friction with which it engages about the pivot axis. As will be appreciated, if the pivot drag adjustment is adjusted so that there is a large amount of drag on the pivot axis, then the angle between the clearing device and wheel plane will remain generally constant during use. Conversely, if the pivot drag adjustment is adjusted so that the pivot drag is very light, then the clearing device can be displaced laterally much more easily relative to the wheel plane for particular applications.

The power unit may be a power unit of any suitable type. Thus, for example, the power unit may be a motor, a gas powered motor, an electric motor, a battery, or the like. The power unit may thus be any conventional power unit as provided on a clearing device of the types which are commercially available.

The clearing head of the clearing device may again be a clearing head of any suitable or conventional type for the intended application of the clearing device. It may conveniently be a clearing head of the type which is conventionally available on any of the large variety of clearing devices which are commercially available. Thus, for example, the clearing head may be in the form of a trimmer head or cutter head when the clearing device is in the form of a trimmer device or cutter device. In an alternative application of the invention, the clearing head may be in the form of a blower fan or impeller where the clearing device is in the form of a blower. In yet a further application of the invention, the clearing head may be in the form of a vacuum or suction fan or impeller when the clearing device is in the form of a vacuum device. In yet a further application of the invention, the clearing head may be in the form of a rotatable cultivator where the clearing device is in the form of a cultivator device. In yet a further application of the invention, the clearing head may be in the form of a rotatable power broom where the clearing device is in the form of a broom device. In yet a further application of the invention, the clearing head may be in the form of a snow clearing head when the clearing device is in the form of a snow blower or a snow thrower, or the like.

In a preferred application of the invention, the elongated support member may have the clearing head removably fitted thereto so that the clearing head may be removed for replacement either by the clearing head of the same or some other type, or by a clearing head for some alternative application of the invention.

The clearing head may be removably attached to the elongated support member by any conventional means such as a separable connection, for example, a threaded connection, a male/female coupling connection, a spigot and socket connection, a clamp connection, or the like. The connection may, for example, include a conventional spring-loaded pin or ball to maintain the connection in an engaged condition and to allow easy release of the connection. Such connections are commercially used in commercially available clearing devices, such as, for example, clearing devices of Ryobi.

Where the clearing heads are removably connected to the elongated support members, the clearing heads are preferably connected to a clearing head portion of the elongated support member shaft which is separable from the rest of the elongated support member. Thus, the separable connection described will be provided between the clearing head portion of the elongated support member and the rest of the elongated support member. The drive shaft sections which are separated when the cutter heads are separated from the rest of the clearing device are normally easily separably connected by any number of conventional means such as, for example, by means of cooperating male and female connections of non-circular cross-section. Any conventional connection system may, of course, be used.

Where the clearing device is in the form of a trimmer device for trimming or cutting vegetation such as grass, weeds, shrubs, brush or the like, the trimmer head may conveniently be a trimmer of the type which uses a cutting line for cutting or trimming vegetation. Alternatively, the trimmer head may be a trimmer head which uses a cutter blade or a set of cutter blades of any conventional type. Where the clearing device is intended for use in cutting brush, wood or other objects, the cutter blade may conveniently be in the form of a circular or annular blade system, or in the form of a reciprocating blade or blade system, or the like.

In the preferred embodiment of the clearing apparatus of this invention, the pivot mount is adapted to removably mount the support member to the frame strut. This arrangement provides the advantage that the clearing device can be removed from the carriage when desired, and that the carriage of this invention is universal in the sense that it can be applied to a large variety of different types, varieties, and sizes of clearing devices.

The removable mount may be provided in any suitable and convenient way. In a presently preferred embodiment of the invention, the removable mount is provided by the swivel connection being adapted not only to mount the elongated support member to the pivot mount, but also to allow the elongated support member to be swiveled about its elongated axis.

Where the swivel mount comprises a pair of opposed clamps, the clamps may have threaded nuts or threaded connections or displaceable clamp mechanisms which can be released to remove the elongated support member from the carriage of the clearing apparatus, or to mount an elongated support member of a clearing device to the carriage to form a clearing apparatus.

In an embodiment of the invention, the clearing apparatus may include a control handle which is mounted on the pivot mount so that the control handle controls movement of the elongated support member and thus of the clearing head relatively to the plane of the support wheel during use.

In this application of the invention, the control handle is provided separately of any control handle which may be provided on a clearing device for normal hand-held operation.

The invention further extends to a carriage for supporting a clearing device of the type comprising an elongated support member, a clearing head mounted at a leading end of the support member, a power unit mounted at a trailing end of the support member, and a drive connection for connecting the power unit to the clearing head; the carriage comprising a frame strut having a lower end portion and having an upper end portion to extend upwardly from the lower end portion during use of the apparatus, a single support wheel having a wheel axis about which the support wheel is rotatably mounted to the lower end portion of the frame strut to support the frame strut on a support surface during use, a pivot mount intermediate the lower and upper end portions of the frame strut for mounting a support member of such a clearing device to the frame strut to form a clearing apparatus, and a guide handle extending from the upper end portion of the frame strut for use in guiding the support wheel during use; the pivot mount having a pivot axis to extend substantially vertically during use to allow the elongated support member of such a mounted clearing device to be pivotally displaced for varying the angle between a clearing device plane of such a clearing device and the support wheel plane during use, the clearing device plane being a plane through the elongated axis of such an elongated support member and which extends substantially vertically during use when such an elongated support member is mounted to the carriage; the guide handle being positioned for an operator grasping the guide handle for guiding the support wheel during use, to be positioned to one side of the support wheel and at least partially in line with part of an axial projection of the support wheel during normal use; the frame strut being shaped so that during use the pivot mount and the guide handle will be in advance of the wheel axis, and so that the guide handle, the pivot axis and the contact point of the support wheel with a support surface during use, will be generally in line during use; and the clearing device being adapted to be mounted to the frame strut so that when so mounted the clearing apparatus comprising the carriage and such a mounted clearing device will be supported proximate its center of gravity on the support wheel when the support wheel and such a mounted elongated support member are generally in line with each other during normal use.

The carriage of this invention may be used as a universal carriage for a large variety of commercially available clearing devices including clearing devices of the same type but of different sizes and clearing devices of different types as discussed herein.

The carriage of this invention may have all of the features of the carriage of the clearing apparatus of this invention as already discussed.

The invention further extends to a clearing apparatus comprising a clearing device for use in clearing operations, and a carriage to which the clearing device is mounted for the carriage to support the clearing device during use; the clearing device comprising a body portion housing a blower fan and a power unit for driving the blower fan, and an elongated blower nozzle extending from the body portion; the carriage comprising a frame strut having a lower end portion and having an upper end portion to extend upwardly from the lower end portion during use of the apparatus, a single support wheel having a wheel axis about which the support wheel is rotatably mounted to the lower end portion of the frame strut to support the frame strut on a support surface during use, a pivot mount intermediate the lower and upper end portions of the frame strut mounting the clearing device to the frame strut, and a guide handle extending from the upper end portion of the frame strut for use in guiding the support wheel during use; the pivot mount having a pivot axis to extend substantially vertically during use to allow the elongated blower nozzle of the clearing device to be pivotally displaced for varying the angle between a clearing device plane and the support wheel plane during use, the clearing device plane being a plane which extends through the elongated axis of the elongated blower nozzle and which extends substantially vertically during use; the guide handle being positioned for an operator grasping the guide handle for guiding the support wheel during use, to be positioned to one side of the support wheel and at least partially in line with part of an axial projection of the support wheel during normal use; and the clearing device being mounted to the frame strut such that the clearing apparatus will be supported proximate its center of gravity on the support wheel when the support wheel and the elongated blower nozzle are generally in line with each other during normal use.

The invention further extends to a carriage for supporting a clearing device of the type comprising a body portion housing a blower fan and a power unit for driving the blower fan, and an elongated blower nozzle extending from the body portion; the carriage comprising a frame strut having a lower end portion and having an upper end portion to extend upwardly from the lower end portion during use of the apparatus, a single support wheel having a wheel axis about which the support wheel is rotatably mounted to the lower end portion of the frame strut to support the frame strut on a support surface during use, a pivot mount intermediate the lower and upper end portions of the frame strut for mounting such a clearing device to the frame strut to form a clearing apparatus, and a guide handle extending from the upper end portion of the frame strut for use in guiding the support wheel during use; the pivot mount having a pivot axis to extend substantially vertically during use to allow an elongated blower nozzle of such a mounted clearing device to be pivotally displaced for varying the angle between a clearing device plane of such a clearing device and the support wheel plane during use, the clearing device plane being a plane through the elongated axis of such an elongated blower nozzle and which extends substantially vertically during use when such a clearing device is mounted to the carriage; the guide handle being positioned for an operator grasping the guide handle for guiding the support wheel during use, to be positioned to one side of the support wheel and at least partially in line with part of an axial projection of the support wheel during normal use; the frame strut being shaped so that during use the pivot mount and the guide handle will be in advance of the wheel axis, and so that the guide handle, the pivot axis and the contact point of the support wheel with a support surface during use, will be generally in line during use; and the clearing device being adapted to be mounted to the frame strut so that when so mounted the clearing apparatus comprising the carriage and such a mounted clearing device will be supported proximate its center of gravity on the support wheel when the support wheel and such a mounted elongated blower nozzle are generally in line with each other during normal use.

The support wheel of the apparatus or carriage of this invention may be a wheel of any suitable or conventional type.

While the support wheel may be relatively small, the wheel could be fairly large to give the greatest height to the axle of the wheel and thus improve the ease of handling of the apparatus, provided the support wheel does not interfere with the movement and use of the clearing device during use.

In practice, the support wheel should therefore be of such a size that the pivot mount, even when in its lowest adjusted position, will still be positioned vertically above the upper edge of the support wheel during use.

Applicant has found that the larger the support wheel, the more readily can the apparatus be steered over or past obstacles such as stones, rocks and bumps, and the more readily can the apparatus be caused to traverse an uneven terrain.

The support wheel may, for example, be in the form of a conventional bicycle wheel. In one preferred embodiment of the invention, the bicycle wheel may be a 12, 16, 20, or 24" diameter wheel. In a presently preferred embodiment, the wheel may be a 20" wheel. For an alternative embodiment, the wheel is preferably a 12" wheel.

The support wheel may have an inflatable tire. Alternatively, the support wheel may have a solid tire, a foam filled tire, a semi-pneumatic tire, or the like.

The support wheel may be provided with a large number of bicycle-type spokes. Alternatively, it may be provided with a relatively low number of broad support spokes or even a disk which has the axle mounted at its center, and a tire or the like at its periphery.

The carriage of this invention may be made of any suitable material, such as aluminum tubing, steel tubing or even reinforced plastic tubing.

The pivot mount may be made of any suitable material, such as a synthetic plastics material, aluminum, brass or the like. In a presently preferred embodiment, the pivot mount may be made of aluminum with brass bushings to pivotally engage with an intermediate portion of the frame strut which is made out of steel tubing.

BRIEF DESCRIPTION OF THE DRAWINGS

Preferred embodiments of the invention are now described by way of example with reference to the drawings.

FIG. 6 shows a side elevation of a clearing apparatus in accordance with this invention, in the form of a blower apparatus.

FIG. 7 shows a rearview of the blower apparatus of FIG. 6.

DESCRIPTION OF ILLUSTRATIVE EMBODIMENTS

Figure 1:
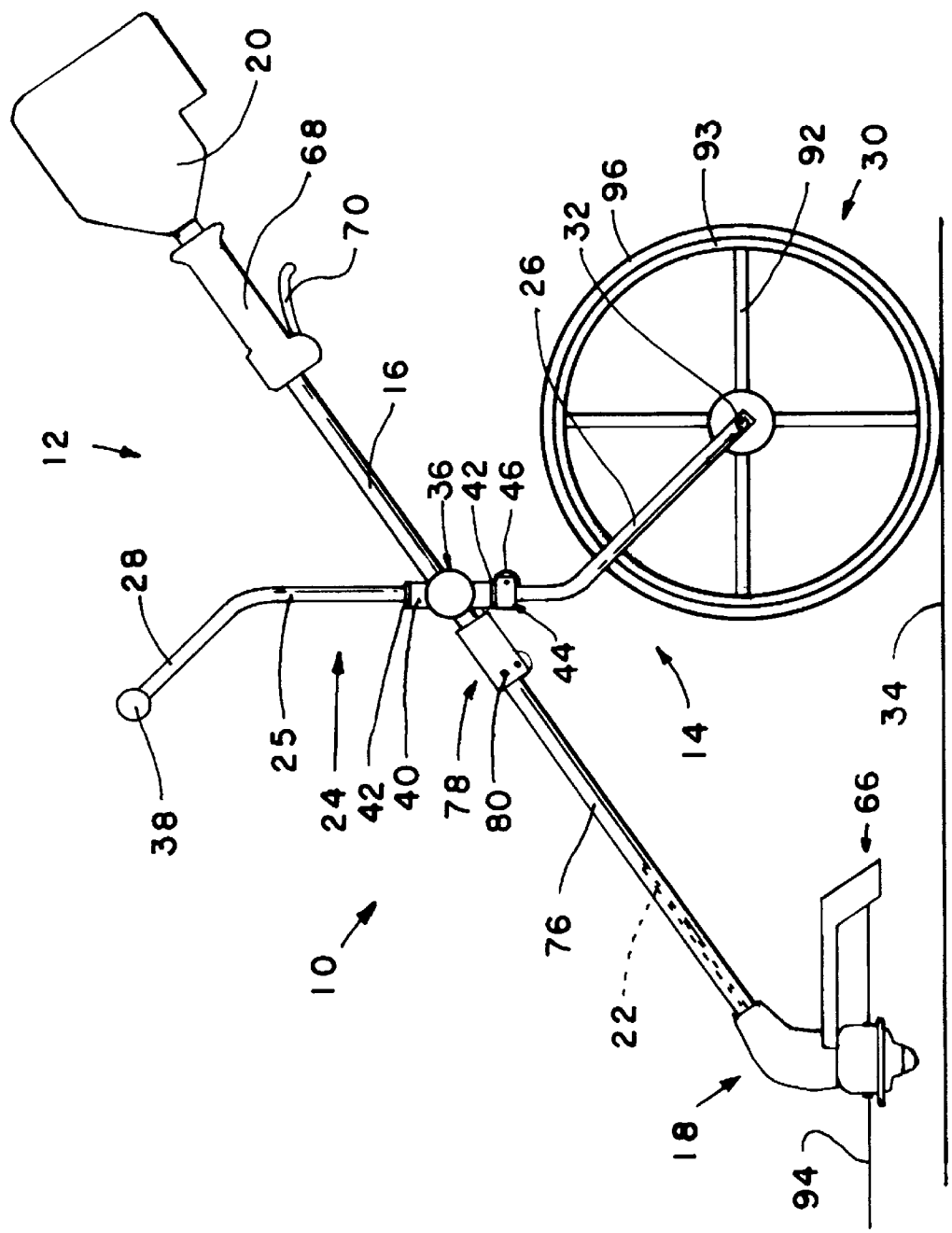
FIG. 1 shows a side elevation of one preferred embodiment of a clearing apparatus in accordance with this invention in the form of a trimmer apparatus.

With reference to FIG. 1 of the drawings, reference numeral 10 refers generally to a clearing apparatus in accordance with one preferred embodiment of this invention, which is in the form of a trimmer apparatus for trimming vegetation in the form of grass, weeds, plants, shrubs, brush and the like.

The clearing apparatus 10 which is in the form of a trimmer apparatus, comprises a clearing device in the form of a trimmer device 12 for use in trimming operations, and a carriage 14 to which the trimmer device 12 is mounted for the carriage 14 to support the trimmer device 12 during use.

The trimmer device 12 is a trimmer device of conventional type, such as that made by companies such as Ryobi and Echo, for example.

The trimmer device 12 comprises an elongated support member 16, a clearing head in the form of a trimmer head 18 mounted at a leading end of the support member 16, a power unit 20 mounted at a trailing end of the support member 16, and a drive connection in the form of a drive shaft 22 (as shown in partial dotted lines in FIG. 1) extending within the elongated support member 16 for connecting the power unit 20 to the trimmer head 18.

The carriage 14 comprises a frame strut 24 having a lower end portion 26 and having an upper end portion 28 to extend upwardly from the lower end portion 26 during use of the trimming apparatus 10, a single support wheel 30 having a wheel axis 32 about which the support wheel is rotatably mounted to the lower end portion 26 of the frame strut 24 to support the frame strut on a support surface 34 during use.

The carriage 14 further comprises a pivot mount 36 intermediate to the lower and upper end portions 26 and 28 of the frame strut 24 removably mounting the support member 16 of the trimmer device 12 to the frame strut 24.

The carriage 14 further comprises a guide handle 38 extending from the upper end portion 28 of the frame strut 24 for use in guiding the support wheel 30 during use.

The pivot mount 36 has a pivot axis which extends along the elongated axis of the intermediate portion 25 of the frame strut 24 (as will be described in more detail with reference to FIG. 2) and which extends substantially vertically during use to allow the elongated support member 16 of the trimmer device 12 to be pivotally displaced for varying the angle between a clearing device plane and the support wheel plane during the clearing device plane being a plane which extends through the elongated axis of the elongated support member 16 and which extends substantially vertically during use. This means that the elongated support member 16 of the trimmer device 12 can be pivotally displaced about the pivot axis of the pivot mount 36 so that the trimmer head 18 can be displaced laterally from side to side during use relatively to the plane in which the support wheel 30 lies.

The guide handle 38 is positioned to extend generally parallel to or preferably substantially parallel to the wheel axis 32, and is positioned for an operator grasping the guide handle 38 for guiding the support wheel 30 during use, to be positioned to one side of the support wheel and at least partially in line with part of an axial projection of the support wheel 30 during normal use.

The frame strut 24 is shaped so that the pivot mount 36 and the guide handle 38 will be in advance of the wheel axis 32 during use, and so that the guide handle 38, the pivot axis of the pivot mount 36, and the contact point of the support wheel 30 with the support surface 34 will be generally in line during use. This arrangement provides the advantage that if the wheel axis 32 trails the pivot mount 36 so that a castor effect is provided during use. This can provide the further advantage that if the trimmer head 18 comes into contact with a lateral obstacle during use, there is no moment applied to the frame strut 24 and thus there is little tendency for the guide handle 38 to twist. In other words, if the trimmer head 18 encounters a lateral obstacle during use, it will tend to pivot the trimmer device 12 laterally about the pivot axis, without providing any significant leverage which would tend to otherwise twist the frame strut 24 and thus the guide handle 38 during use.

The trimmer device 12 is mounted to the frame strut 24 such that the trimmer apparatus 10 will be supported proximate its center of gravity on the support wheel 30 when the support wheel 30 and the elongated support member 16 are generally in line with each other during normal use.

This arrangement provides the advantage that the trimmer apparatus 10 will be supported sufficiently close to its center of gravity on the support wheel 30 so that the trimmer device 12 can be controlled with the minimum of effort and with the minimum of load on the hands and arms of the operator.

It will be appreciated that while the trimmer apparatus 10 is supported proximate its center of gravity on the support wheel 30 during use, the trimmer device 12 is not necessarily connected to the pivot mount at the center of gravity of the trimmer device 12. Precisely where the trimmer device 12 is mounted to the pivot mount 36 along the length of the elongated support member 16, will depend upon the trimmer head 18 and the power unit 20 and where the elongated support member 16 needs to be mounted to the pivot mount 36 so that the center of gravity of the entire apparatus 10 is supported above the support wheel 30 during use, that is substantially vertically in line with the wheel axis 32.

Figure 2:
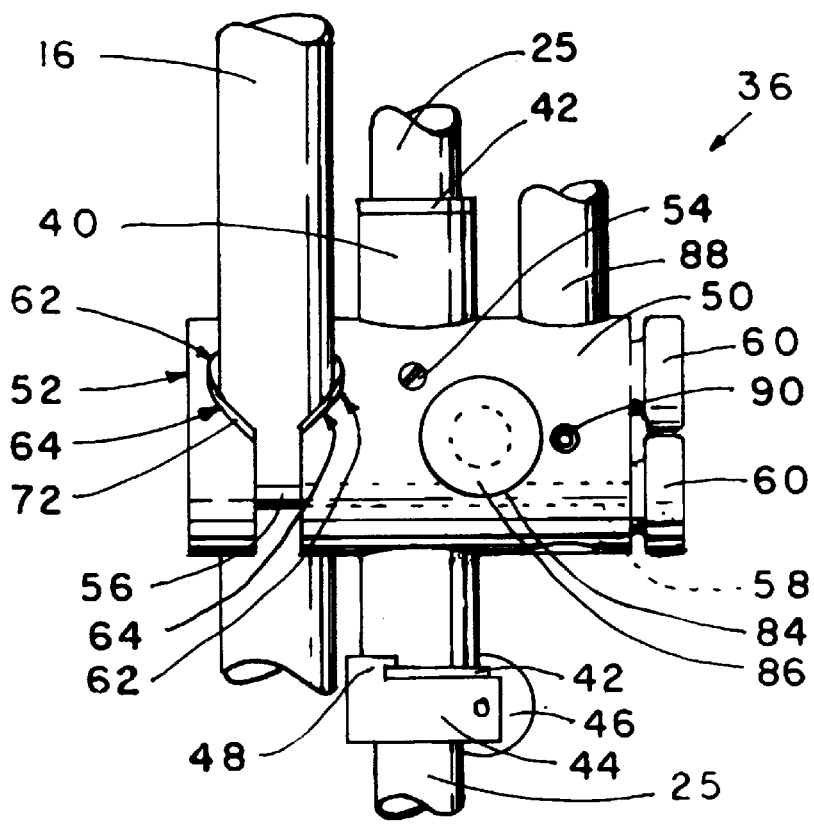
FIG. 2 shows a detailed elevation of the pivot mount of the clearing apparatus of FIG. 1.

As shown more particularly in FIG. 2 of the drawings, the pivot mount 36 has a pivot bushing tube 40 which is preferably in the form of an aluminum or steel tube, and which has bronze bushings 42 at its upper and lower ends.

The bronze bushings 42 engage pivotally with the intermediate portion of the frame strut 24. The frame strut 24 is preferably made out of steel tubing which is bent into the configuration shown in FIG. 1 of the drawings. The pivot bushing tube 40 with its bronze bushings 42 may be fitted over the frame strut 24 before it is bent into the configuration shown in FIG. 1.

The pivot mount 36 further includes a height adjustment clamp 44 which is mounted on the intermediate portion 25 of the frame strut 24.

The height adjustment clamp 44 has a bore which receives the intermediate portion 25 of the frame strut 24. The bore is defined by a split in the height adjustment clamp 44 to define two opposed sides of the height adjustment clamp 44 which can be drawn together by means of a screw adjustment 46 to clamp the height adjustment clamp 44 to the intermediate portion 25 of the frame strut 24 at a desired height adjustment.

The height adjustment clamp 44 has an engagement flange 48 which engages the lowermost bushing 42 to prevent displacement of the pivot bushing tube 40 relatively to the height adjustment clamp 44 along the length of the intermediate portion 25 of the frame strut 24, while allowing the pivot bushing tube 40 to be pivotally displaced about the intermediate portion 25 of the frame strut 24 while the height adjustment clamp 44 remains clamped to the intermediate portion 25.

By loosening the screw adjustment 46, the pivot bushing tube 40 and thus the pivot mount 36 can, together with the height adjustment clamp 44, be displaced along the intermediate portion 25 until the trimmer device 12 is supported at an appropriate height along the intermediate portion 25 for the operator to use.

Since the operator is not supporting the weight of the trimmer device 12 nor the weight of the clearing apparatus 10, the height adjustment can be made so that it is convenient for the operator to use with the arms of the operator conveniently bent at the elbow while operating the apparatus 10.

The pivot mount 36 further comprises a first swivel clamp 50 and a second swivel clamp 52.

The first swivel clamp 50 has the pivot bushing tube 40 extending through a bore therein, and the first swivel clamp 50 is fixed to the pivot bushing tube 40 by means of a locking screw 54.

The second swivel clamp 52 has a pair of threaded bolts 56 which extend therefrom and are fixed thereto.

The first swivel clamp 50 has a pair of bores 58 into which the threaded bolts 56 can be loosely inserted.

As shown in FIG. 2, the threaded bolts 56 of the second swivel clamp 52 have been inserted through the bores 58 of the first swivel clamp 50 so that they extend through the first swivel clamp 50, and have clamp nuts 60 threaded onto their ends which project from the first swivel clamp 50 out of the bores 58.

By tightening the clamp nuts 60 onto the ends of the threaded bolts 56, the first and second swivel clamps 50 and 52 are clamped together for removably clamping the elongated support member 16 of the trimmer device 12 between the first and second swivel clamps 50 and 52. In this way the elongated support member 16 of the trimmer device 12 is removably mounted to the swivel clamps 50 and 52 and thus to the pivot mount 36.

By unscrewing the clamp nuts 60 and withdrawing the second swivel clamp 52 relatively to the first swivel clamp 50, the threaded bolts 56 are pulled from the bores 58 and the elongated support member 16 can be disengaged from the pivot mount 36.

This arrangement provides the advantage that a clearing device or a trimmer device of any suitable desired size or type can be mounted to the pivot mount 36 for use in the apparatus 10. Thus, the carriage 14 is in the form of a universal carriage which can be used with most of the commercially available clearing devices which are currently available on the market and generally are characterized by having an elongated support member such as the support member 16, a clearing head such as the trimmer head 18 at one head, and a power unit such as the power unit 20 at the other end.

The first and second swivel clamps 50 and 52 each have a V-shaped groove 62. Each V-shaped groove 62 is defined by a pair of angled surfaces 64.

The angled surfaces 64 of each V-shaped groove 62 define surfaces which can engage with the outer surface of the elongated support member 16 to provide for a firm and effective clamping action of the elongated support member 16 between the first and second swivel clamps 50 and 52.

The V-shaped grooves 62 and angled surfaces 64 provide the advantage that elongated support members 16 of different diameters and different cross-sections can be accommodated within the opposed V-shaped grooves 62 for clamping to the pivot mount 36.

In FIG. 1 of the drawings, the trimmer device 12 is shown with the trimmer head 18 in its normal trimming position. In the normal trimming position the trimmer head 18 has a blade plane 66 which is substantially parallel to the support surface 34 so that vegetation on the support surface 34 can be trimmed.

Figure 4:
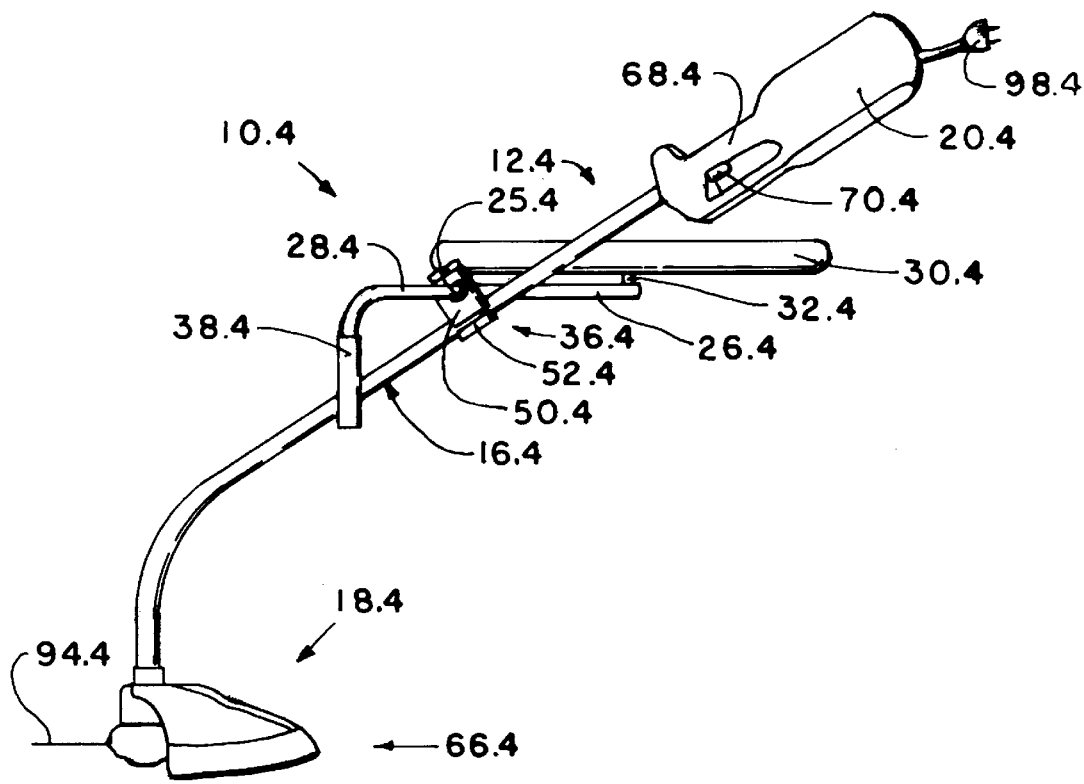
FIG. 4 shows a plan view of the trimmer apparatus of FIG. 1, with the clearing device swiveled about the elongated axis of the elongated support member so that the clearing head is in one of its edging positions.

When the clamp nuts 60 are loosened, the elongated support member 16 can be swiveled about its elongated axis to swivel the trimmer head into an edging position as shown particularly in FIG. 4 of the drawings.

The trimmer device 12 can in fact be swiveled, for example, about the elongated axis of the support member 16 through approximately 110° in one direction relatively to the position shown in FIG. 1, to provide a first edging position. In the same way, it can be swiveled about its elongated axis in the opposite direction through an angle of 110° to present an alternative or second edging position.

Since the carriage 14 of the apparatus 10 is in the form of a universal carriage which can readily have a large variety of clearing devices mounted thereto for forming a clearing apparatus such as the apparatus 10, a relatively simple specification can be provided to show precisely where the elongated support member 16 of a particular clearing device must be clamped to the pivot mount 36 to ensure that the clearing apparatus 10 will be supported proximate its center of gravity on the support wheel 30 during normal use.

The trimmer device 12 shown in FIG. 1 of the drawings, is conveniently a trimmer device of the type marketed by, for example, Ryobi.

The trimmer device 12 is shown having a control handle 68 mounted on the supported member 16 near the power unit 20.

The control handle 68 is of conventional type, and has a control switch 70 to control the power unit 20. The control handle 68 further includes a vibration attenuation sleeve (not shown) to attenuate vibration between the elongated support member 16 and the control handle 68. This vibration attenuation sleeve is of conventional type.

As shown in FIG. 2, the pivot mount 36 further includes vibration attenuation pads 72 to further attenuate vibration between the elongated support member 16 and the pivot mount 36, and thus the carriage 14 during use.

The trimmer device 12 is shown having a power unit in the form of a gas powered motor while the trimmer head 18 is a trimmer of the line type which has a line for performing the trimming operation.

The trimmer device 12 is further shown having the elongated support member 16 with a detachable leading end on clearing head portion 76.

The trimmer head 18 is mounted on the detachable leading end on clearing head portion 76 and a leading end of the drive shaft 22 is operatively attached to the trimmer head 18 and extends within the leading end 76.

The detachable leading end 76 is connected to the remainder of the elongated support member 16 at a coupling on separable connection 78.

The coupling on separable connection 78 may be a coupling of any conventional or suitable type. A very convenient form of coupling 78 is provided by Ryobi in which the leading end 76 and the rest of the elongated support member 16 are removably engaged with a spigot and socket coupling engagement, and a spring biased retaining pin 80 maintains the coupling 78 in coupled engagement.

By depressing the pin 80, the leading end 76 of the elongated support member 16 can be detached from the rest of the elongated support member 16. This makes it easy for an alternative type of clearing head 18 mounted on a corresponding leading end on clearing head portion 76 to be attached to the rest of the elongated support member 16 and to thus form part of the clearing apparatus 10.

As will be appreciated, the drive shaft 22 has a portion within the leading end on clearing head portion 76 and the remaining portion is positioned within the remaining part of the elongated support member 16. They may be engaged by any conventional means such as, for example, a spigot and socket connection which is noncircular so that the drive shaft will maintain its drive action. Any other conventional or suitable type of connect and disconnect connection may also be provided.

The guide handle 38 and control handle 68 are positioned on opposed sides of the center of gravity of the clearing apparatus 10. They are further positioned so that an operator grasping the guide handle 38 with one hand and the control handle 68 with the other hand during use will be standing proximate the center of gravity of the apparatus 10 and substantially in line with the axial extension of the wheel axis 32 during use.

In this position, the operator can guide the movement of the apparatus 10 by controlling the guide handle 38 and thus the direction of movement of the support wheel 30. At the same time the operator can control the trimmer device 12 by means of the control handle 68 and can, if desired, displace the trimmer head 18 laterally relatively to the plane of the support wheel 30. For most trimming operations the operator tends to move the carriage 14 and the trimmer device 12 as a unit without any great deal of pivotal displacement plane of the trimmer device 12 relatively to the plane of the support wheel 30. Instead, to provide lateral reach for the trimmer head 18, the entire apparatus 10 tends to be pivotally displaced about the contact point of the support wheel 30 with the support surface 34.

As can be seen in FIG. 2, the pivot mount 36 therefore includes a pivot drag adjustment 84.

The pivot drag adjustment 84 includes an adjustment nut 86 on the first swivel clamp 50. The adjustment nut 86 is mounted on a threaded shaft which has a bearing surface (not shown) at its inner end to engage with the intermediate portion 25 through a hole provided within the first swivel clamp 50 through the pivot bushing tube 40.

By adjusting the adjustment nut 86 the degree of drag on the intermediate portion 25 can be adjusted to adjust the ease with which the pivot mount 36 can be pivotally displaced about the intermediate portion 25 of the frame strut 24.

Thus, when the operator wishes to use the trimmer device 12 and the carriage 14 as a unit, the operator can conveniently tighten the adjustment nut 86 to put heavy drag on any relative pivotal displacement of the pivot mount 36 relatively to the intermediate portion 25 of the carriage 14. On the other hand, if the operator wishes to move the trimmer head 18 laterally relatively to the plane of the support wheel 30 during use on a frequent and continuous basis, the operator can loosen the adjustment nut 86 to reduce the frictional engagement between the pivot mount 36 and the intermediate portion 25 and thus facilitate lateral displacement of the trimmer head 18 during use.

As can be seen in FIG. 1, the lower end portion 26 of the frame strut 24 is bent or curved in the trailing direction relatively to the intermediate portion 25 so that the support wheel 30 operates in the form of a castor wheel and thus readily follows the direction of forward movement of the apparatus 10 during use. This facilitates handling of the apparatus 10 through the guide handle 38.

Since the clearing apparatus 10 is supported on the support wheel 30 substantially about its center of gravity, the operator does not have to support any significant mass in the apparatus 10 during use and can, with almost finger control, operate the apparatus 10.

This provides the advantage that the operator can operate the apparatus 10 without the degree of strain on the back, shoulders and arms of an operator which is normally the case where a hand-held clearing device is used. At the same time, because of the pivotal connection between the trimmer device 12 and the pivot mount 36, and because the apparatus 10 can be pivotally displaced on the support surface 34 by simply pivoting the support wheel 30 thereon, the degree of lateral reach of the trimmer head 18 is not reduced relatively to a hand-held trimmer device 12. To the contrary, the degree of reach is in fact enhanced since the operator does not have to hold the trimmer device 12 close to his or her body to operate the device. The operator can, if desired, move the clearing apparatus 10 sideways or in advance of the operator to reach difficult spots which would otherwise not be as convenient with a hand-held trimmer device 12.

In use of the apparatus 10, the support wheel 30 can be guided with the guide handle 38 or with the control handle 68, or preferably with both handles. The position of the clearing head 18 relative to the direction of movement during use, can be controlled by pivoting the control handle 68 relative to the guide handle 38 about the vertical pivot axis of the pivot mount 36, or by pivoting the guide handle 38 relative to the control handle 68 about the contact point of the wheel 30 with the ground surface 34, or with a combination of both.

The height of the clearing head 18 above the ground surface 34 can readily be controlled by controlling the relative heights of the guide handle 38 and control handle 68.

The apparatus 10 is fast and easy to operate because the angle between the vertical plane extending through the elongated support member 16 and the plane of the support wheel 30 can be changed during use. This provides the advantage that edging operations along a varying radius curve can be performed with little difficulty.

The pivot drag adjustment allows friction for relative pivotal movement to be adjusted from a very low level to a locked or virtual locked position. In the locked position the apparatus is controlled to provide better leverage to pivot at the contact point of the wheel with a support surface. On the other hand, with a small amount of friction in the pivot axis, the operator can pivot the apparatus laterally on the wheel as if it were in a locked position, while retaining the ability to pivot the clearing device in relation to the wheel as needed during clearing operations. When operating on steep slopes, the clearing device can be pivoted on the vertical axis for lateral movement of the clearing head while the support wheel is guided in the desired direction without pivoting on the ground surface. In addition, with a low level of drag, the operator can guide the wheel around an obstacle while pivoting the clearing head to the area to be cleared.

FIG. 2 shows an alternative embodiment of the invention in which a control handle such as the control handle 68 is mounted on a control handle tube 88.

Figure 5:
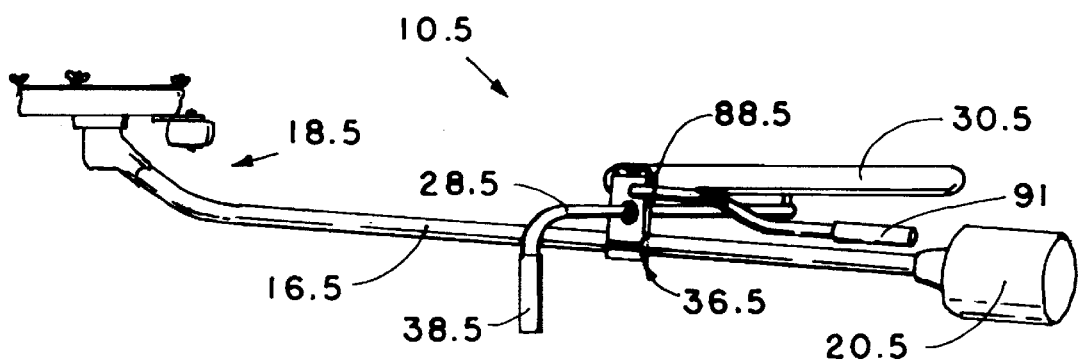
FIG. 5 shows a plan view of an alternative embodiment of a clearing apparatus in accordance with this invention, which has a control handle mounted on the pivot mount.

This aspect of the invention is described in more details with reference to FIGS. 2 and 5 of the drawings.

The control handle tube 88 is illustrated in FIG. 2 of the drawings as mounted in a bore in the first swivel clamp 50 by means of a spring pin 90.

As shown particularly in FIG. 5 of the drawings, the control handle tube 88 has a control handle 91 mounted thereon.

Where a control handle 68 which is provided on the trimmer device 12 or on the clearing device 12 is used, then no separate control handle tube 88 or separate control handle 91 is required.

Since the control handle tube is fixed to the first swivel clamp 50, the control handle 91 is used to control the lateral displacement of the trimmer device 12 relatively to the plane of the support wheel 30.

As can be seen particularly in FIG. 1 of the drawings, the single support wheel 30 is a molded plastic wheel having four spokes 92, an annular rim 93 and a foam filled tire 96 mounted on the annular rim 93.

Figure 3:
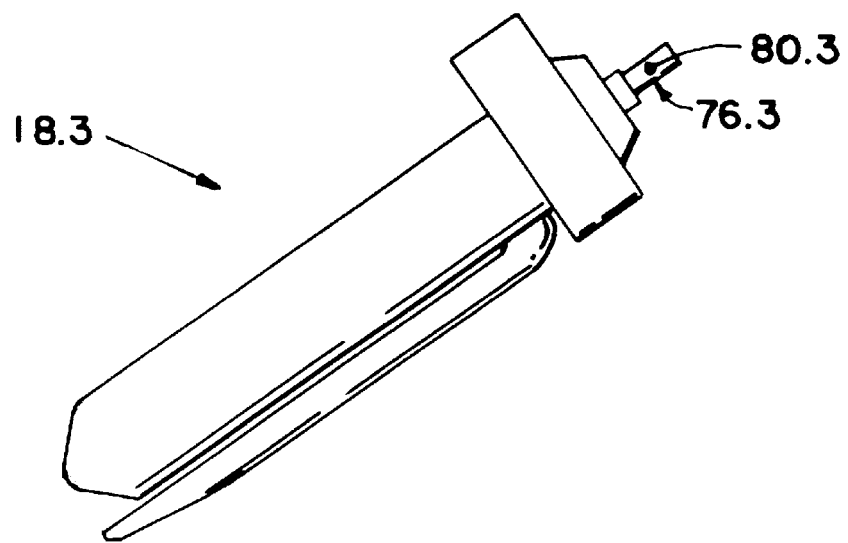
FIG. 3 shows a side elevation of a clearing head of one general type which forms a removable part of a clearing device.

With reference to FIG. 3 of the drawings, reference numeral 18.3 refers generally to a clearing head which is mounted on a detachable leading end on clearing head portion 76.3 of an elongated support member.

As discussed with reference to FIG. 1 of the drawings, the detachable leading end 76.3 can be removably attached to an elongated support member 16 of a clearing device to provide for a desired type of clearing operation.

As shown in FIG. 3 of the drawings in one embodiment of the invention, the clearing head 18.3 may be in the form of a combination blower and vacuum head, typically of the type commercially sold by Ryobi.

In an alternative embodiment of the invention, the clearing head 18.3 may instead be in the form of a trimmer head 18 as shown in FIG. 1 of the drawings having a line 94 to form the cutting system for cutting vegetation during use.

Alternatively, however, the clearing head 18.3 may be in the form of a cutter head having a circular or annular cutter blade system, or having a reciprocating blade system for cutting vegetation, wood and other objects.

In yet a further alternative embodiment of the invention, the clearing head 18.3 may be in the form of a blower head or in the form of a vacuum head for performing blower or vacuum operations respectively.

In yet a further alternative application of the invention, the clearing head 18.3 may be in the form of a rotatable cultivator head to cultivate soil, or in the form of a rotatable broom head to serve as a power broom.

In yet a further alternative embodiment of the invention, the clearing head 18.3 may be in the form of a snow clearing head for clearing snow. This may again be in the form of a snow clearing head of conventional type.

Any one of these alternative types of clearing heads 18.3 may be mounted on an elongated support member 16 to provide a clearing apparatus 10 having a desired application.

It will be appreciated, however, that instead of having a detachable leading end on clearing head portion 76 with a desired clearing head 18.3, a clearing device may be used in the apparatus 10 which has a clearing head 18.3 with a desired utility.

With reference to FIG. 4 of the drawings, reference numeral 10.4 refers generally to an alternative embodiment of a clearing apparatus in accordance with this invention.

In the embodiment of FIG. 4, the clearing apparatus 10.4 includes a clearing device in the form of a trimmer device 12.4.

In FIG. 4 of the drawings, corresponding parts of the clearing apparatus 10.4 to those of the clearing apparatus 10 illustrated in FIG. 1 of the drawings, are indicated by corresponding reference numerals except that the suffix "0.4" is used after the reference numeral. In the clearing apparatus 10.4 the clearing device 12.4 is shown having an elongated support member 16.4 which is curved. In addition, the power unit 20.4 is shown in the form of an electric motor having a connection 98.4 or connecting the electric motor 20.4 to a source of electrical power.

In the plan view of the apparatus 10.4 as shown in FIG. 4, the trimmer device 12.4 is shown where it has been pivoted into one of its edging positions where the trimmer head 18.4 is oriented so that the blade plane 66.4 extends substantially vertically.

In this position, the trimmer head 18.4 has been pivoted for edging. It will be noted that an operator operating the apparatus 10.4 will be standing in a position where the support wheel 30.4 can be moved in a direction parallel to the blade plane 66.4 for performing edging operations.

If the elongated support member 16.4 is swiveled the opposite direction to a position where the blade plane is approximately vertical but on the opposite side of the wheel 30.4 from the position shown in FIG. 4, the trimmer head 18.4 will be in its alternative edging position. This can be an advantage for certain edging operations.

With reference to FIG. 5 of the drawings, reference numeral 10.5 refers generally to another alternative embodiment of a clearing apparatus in accordance with this invention.

In the embodiment of FIG. 5, the clearing apparatus 10.5 includes a clearing device in the form of a "stick edger", in which the plane of the edging blade is almost parallel with the elongated support member 16.5 instead of being at an angle of about 30 degrees as with most trimmers. The "stick edger" allows the plane of the cutting blade and the plane of the support wheel to be closer to each other, allowing better control and easier sighting down the cutter blade plane when edging. The "stick edger" is easier to edge with, but is not able to be used for horizontal trimming. The "stick edgers" are made both as convertible and non-convertible units. The unit shown in FIG. 5 is the non-convertible type, but either type could be used in this embodiment.

The embodiment of FIG. 5 also shows the control handle tube 88.5 and the control handle 91 mounted to the pivot mount 36.5.

With particular reference to FIGS. 6 and 7 of the drawings, reference numeral 10.6 refers generally to a clearing apparatus in the form of a blower apparatus.

The clearing apparatus 10.6 corresponds in many respects with the clearing apparatus 10. Corresponding elements of the clearing apparatus 10.6 are therefore indicated with corresponding reference numerals except that the suffix "0.6" has been used after the reference numeral.

In the blower apparatus 10.6 a control handle tube 88.6 is shown extending from the pivot mount 36.6, and having a control handle 91.6 mounted thereon.

The blower apparatus 10.6 includes a hanger bracket 100 extending from the control handle tube 88.6.

The hanger bracket 100 is curved to allow a clearing device 12.6 in the form of a blower to be removably suspending from the hanger bracket 100.

The blower 12.6 includes a body portion 102 having a support handle 104 by which the blower 12.6 can be held for manual operation.

The support handle 104 is shown hooked on to the hanger bracket 100 to support the blower 12.6 on the carriage 14.6 of the apparatus 10.6.

The blower apparatus 12.6 is of conventional type which is commercially available.

The body portion 102 houses a blower fan with a power unit for rotatably driving the blower fan.

The blower device 12.6 further includes an elongated blower nozzle 105 extending from the body portion 102.

The blower nozzle 105 is attached to the carriage 14.6 by means of a strap 106.

In use, as described with reference to FIG. 1 of the drawings, the apparatus 10.6 can be guided by means of the guide handle 38.6 whereas the direction of the blower nozzle 104 may be varied by varying the inclination of the control handle 91.6 relatively to the plane of the support wheel 30.6.

In the embodiment of the clearing apparatus 10.4 as illustrated in FIG. 4 of the drawings, the drive connection connecting the power unit 20.4 to the clearing head 18.4, is preferably a flexible drive shaft.

In an alternative embodiment of the invention, the power unit may comprise a storage battery. In this embodiment of the invention, the drive unit for driving the clearing head may be provided either in the power unit 20 or at the clearing head 18. If it is provided at the clearing head 18, then the drive connection between the power unit 20 and the clearing head 18 may be an electrical connection to convey electrical power from the power unit 20 to the clearing head 18.

The invention of this application can provide a number of advantages in addition to those already enumerated. The invention can provide the further advantage that since the apparatus is supported substantially at its center of mass, a heavy duty power unit—whether in the form of a substantial storage battery or a four cycle engine—can be used in the apparatus.

The invention can provide the further substantial advantage that the carriage is of relatively simple and inexpensive construction and can be used as a universal carriage with a large number and variety of commercially available clearing devices.

What is claimed is:

1. A clearing apparatus comprising a clearing device for use in clearing operations, and a carriage to which the clearing device is mounted for the carriage to support the clearing device during use;

the clearing device comprising an elongated support member, a clearing head mounted at a leading end of the support member, a power unit mounted at a trailing end of the support member, and a drive connection for connecting the power unit to the clearing head;

the carriage comprising a frame strut having a lower end portion and having an upper end portion to extend upwardly from the lower end portion during use of the apparatus, a single support wheel having a support wheel plane and a wheel axis about which the support wheel is rotatably mounted to the lower end portion of the frame strut to support the frame strut on a support surface during use, a pivot mount intermediate the lower and upper end portions of the frame strut mounting the support member of the clearing device to the frame strut, and a guide handle extending from the upper end portion of the frame strut for use in guiding the support wheel during use;

the pivot mount having a pivot axis to extend substantially vertically during use to allow the elongated support member of the clearing device to be pivotally displaced for varying the angle between a clearing device plane and the support wheel plane during use, the clearing device plane being a plane which extends through the elongated axis of the elongated support member and which extends substantially vertically during use;

the guide handle being positioned for an operator grasping the guide handle for guiding the support wheel during use, to be positioned to one side of the support wheel and at least partially in line with part of an axial projection of the support wheel during normal use;

the frame strut being shaped so that the pivot mount and the guide handle will be in advance of the wheel axis during use, and so that the guide handle, the pivot axis and the contact point of the support wheel with a support surface during use, will be generally in line during use; and the clearing device being mounted to the frame strut such that the clearing apparatus will be supported proximate its center of gravity on the support wheel when the support wheel and the elongated support member are generally in line with each other during normal use.

2. A clearing apparatus according to claim 1, in which the pivot mount is pivotally mounted on the frame strut to be pivotally displaceable about the frame strut for pivotally displacing the elongated support member relatively to the support wheel plane during use.

3. A clearing apparatus according to claim 1, in which the pivot mount is displaceable along the frame strut intermediate the upper and lower end portions for adjusting the height at which the clearing device is supported on the frame strut during use.

4. A clearing apparatus according to claim 1, in which the lower portion of the frame strut is angled relatively to the intermediate portion so that the support wheel operates as a castor wheel during use.

5. A clearing apparatus according to claim 1, in which the pivot mount has a swivel connection connecting the elongated support member to the pivot mount to allow the elongated support member to be swiveled about its elongated axis for different clearing operations.

6. A clearing apparatus according to claim 5, in which the swivel connection is provided by a pair of swivel clamps which are clamped together to lock the elongated support member between them in a desired orientation.

7. A clearing apparatus according to claim 6, in which at least one of the swivel clamps has a generally v-shaped groove to define surfaces for engaging with the elongated support member during use.

8. A clearing apparatus according to claim 7, in which both swivel clamps have generally v-shaped grooves.

9. A clearing apparatus according to claim 6, in which the swivel clamps include vibration attenuation mounts to attenuate vibration between the clearing device and the frame strut during use.

10. A clearing apparatus according to claim 1, in which the pivot mount mounts the elongated support member to extend at an angle of between about 28° and about 40° to the horizontal during use.

11. A clearing apparatus according to claim 10, in which the pivot mount mounts the elongated support member to extend at an angle of about 35° to the horizontal during use.

12. A clearing apparatus according to claim 1, in which the frame strut is shaped so that a line extending from the guide handle to the contact point of the support wheel and a support surface during use, extends at a lead angle of between about 15° and about 25° to the vertical during normal use.

13. A clearing apparatus according to claim 12, in which the frame strut is shaped so that the lead angle is about 20° to the vertical during normal use.

14. A clearing apparatus according to claim 1, in which the frame strut is shaped so that the guide handle, the pivot axis and the contact point of the support wheel with a support surface during use, will be substantially in line during normal use.

15. A clearing apparatus according to claim 1, in which the guide handle and the wheel axis are substantially parallel.

16. A clearing apparatus according to claim 1, in which the guide handle is positioned for an operator grasping the guide handle for guiding the support wheel during use to be positioned substantially in line with an axial projection of the support wheel during normal use.

17. A clearing apparatus according to claim 1, including a control handle which is provided on the clearing device on the trailing side of the center of gravity of the clearing apparatus during use.

18. A clearing apparatus according to claim 17, in which the guide handle and control handle are positioned so that an operator grasping the handles for use of the apparatus will be positioned proximate the center of gravity of the apparatus during normal use.

19. A clearing apparatus according to claim 1, in which the power unit comprises a motor and in which the drive connection comprises a drive shaft operatively connecting the clearing head to the motor.

20. A clearing apparatus according to claim 1, which is in the form of a trimmer apparatus with the clearing device being in the form of a trimmer device for trimming vegetation, and with the clearing head being in the form of a cutter head.

21. A clearing apparatus according to claim 20, in which the cutter head is a cutter of the line type using a flexible line for cutting.

22. A clearing apparatus according to claim 1, which is in the form of a blower apparatus, with the clearing device being in the form of a blower device, and with the clearing head being in the form of a blower head.

23. A clearing apparatus according to claim 1, which is in the form of a vacuum apparatus, with the clearing device being in the form of a vacuum device, and with the clearing head being in the form of a vacuum head.

24. A clearing apparatus according to claim 1, in which the pivot mount removably mounts the support member to the frame strut.

25. A clearing apparatus according to claim 1, in which the pivot mount includes a pivot drag adjustment for adjusting the degree of drag about its pivot axis.

26. A clearing apparatus according to claim 1, including a control handle which is mounted on the pivot mount so that the control handle controls movement of the elongated support member and thus of the clearing head relatively to the plane of the support wheel during use.

27. A carriage for supporting a clearing device of the type comprising an elongated support member, a clearing head mounted at a leading end of the support member, a power unit mounted at trailing end of the support member, and a drive connection for connecting the power unit to the clearing head;

the carriage comprising a frame strut having a lower end portion and having an upper end portion to extend upwardly from the lower end portion during use of the apparatus, a single support wheel having a support wheel plane and a wheel axis about which the support wheel is rotatably mounted to the lower end portion of the frame strut to support the frame strut on a support surface during use, a pivot mount intermediate the lower and upper end portions of the frame strut for mounting a support member of such a clearing device to the frame strut to form a clearing apparatus, and a guide handle extending from the upper end portion of the frame strut for use in guiding the support wheel during use;

the pivot mount having a pivot axis to extend substantially vertically during use to allow an elongated support member of such a mounted clearing device to be pivotally displaced for varying the angle between a clearing device plane of such a clearing device and the support wheel plane during use, the clearing device plane being a plane through the elongated axis of such an elongated support member and which extends substantially vertically during use when such an elongated support member is mounted to the carriage;

the guide handle being positioned for an operator grasping the guide handle for guiding the support wheel during use, to be positioned to one side of the support wheel and at least partially in line with part of an axial projection of the support wheel during normal use;

the frame strut being shaped so that during use the pivot mount and the guide handle will be in advance of the wheel axis, and so that the guide handle, the pivot axis and the contact point of the support wheel with a support surface during use, will be generally in line during use; and the clearing device being adapted to be mounted to the frame strut so that when so mounted the clearing apparatus comprising the carriage and such a mounted clearing device will be supported proximate its center of gravity on the support wheel when the support wheel and such a mounted elongated support member are generally in line with each other during normal use.

28. A carriage according to claim 27, in which the pivot mount is pivotally mounted on the frame strut to be pivotally displaceable about the frame strut for pivotally displacing an elongated support member of such a mounted clearing device relatively to the support wheel plane during use.

29. A carriage according to claim 27, in which the pivot mount is displaceable along the frame strut intermediate the upper and lower end portions for adjusting the height at which such a mounted clearing device is supported on the frame strut during use.

30. A carriage according to claim 27, in which the lower portion of the frame strut is angled relatively to the intermediate portion so that the support wheel operates as a caster wheel during use.

31. A carriage according to claim 27, in which the pivot mount has a swivel connection for connecting an elongated support member of such a clearing device to the pivot mount to allow an elongated support member of such a clearing device to be swiveled about its elongated axis for different clearing operations.

32. A carriage according to claim 31, in which the swivel connection is provided by a pair of swivel clamps which are clamped together to lock an elongated support member of such a clearing device between them in a desired orientation.

33. A carriage according to claim 32, in which at least one of the swivel clamps has a generally v-shaped groove to define surfaces for engaging with an elongated support member of such a clearing device during use.

34. A carriage according to claim 33, in which both swivel clamps have generally v-shaped grooves.

35. A carriage according to claim 32, in which the swivel clamps include vibration attenuation mounts to attenuate vibration between such a mounted clearing device and the frame strut during use.

36. A carriage according to claim 27, in which the frame strut is shaped so that the line extending from the guide handle to the contact point of the support wheel and a support surface during use, extends at a lead angle of between about 15° and about 25° to the vertical during normal use.

37. A carriage according to claim 27, in which the frame strut is shaped so that the guide handle, the pivot axis and the contact point of the support wheel with a support surface during use will be substantially in line during normal use.

38. A carriage according to claim 27, in which the guide handle is positioned for an operator grasping the guide handle for guiding the support wheel during use to be positioned substantially in line with the axial projection of the support wheel during normal use.

39. A clearing apparatus comprising a clearing device for use in clearing operations, and a carriage to which the clearing device is mounted for the carriage to support the clearing device during use;

the clearing device comprising a body portion housing a blower fan and a power unit for driving the blower fan, and an elongated blower nozzle extending from the body portion;

the carriage comprising a frame strut having a lower end portion and having an upper end portion to extend upwardly from the lower end portion during use of the apparatus, a single support wheel having a support wheel plane and a wheel axis about which the support wheel is rotatably mounted to the lower end portion of the frame strut to support the frame strut on a support surface during use, a pivot mount intermediate the lower and upper end portions of the frame strut mounting the clearing device to the frame strut, and a guide handle extending from the upper end portion of the frame strut for use in guiding the support wheel during use;

the pivot mount having a pivot axis to extend substantially vertically during use to allow the elongated blower nozzle of the clearing device to be pivotally displaced for varying the angle between a clearing device plane and the support wheel plane during use, the clearing device plane being a plane which extends through an elongated axis of the elongated blower nozzle and which extends substantially vertically during use;

the guide handle being positioned for an operator grasping the guide handle for guiding the support wheel during use, to be positioned to one side of the support wheel and at least partially in line with part of an axial projection of the support wheel during normal use; and the clearing device being mounted to the fame strut such that the clearing apparatus will be supported proximate its center of gravity on the support wheel when the support wheel and the elongated blower nozzle are generally in line with each other during normal use.

40. A clearing apparatus according to claim 39, in which the pivot mount has a pivot arm extending therefrom, and in which the clearing device is suspended from the pivot arm.

41. A clearing apparatus according to claim 39, in which the pivot mount is pivotally mounted on the frame strut to be pivotally displaceable about the frame strut for pivotally displacing the elongated support nozzle relatively to the support wheel plane during use.

42. A carriage for supporting a clearing device of the type comprising a body portion housing a blower fan and a power unit for driving the blower fan, and an elongated blower nozzle extending from the body portion;

the carriage comprising a frame strut having a lower end portion and having an upper end portion to extend upwardly from the lower end portion during use of the apparatus, a single support wheel having a support wheel plane and a wheel axis about which the support wheel is rotatably mounted to the lower end portion of the frame strut to support the frame strut on a support surface during use, a pivot mount intermediate the lower and upper end portions of the frame strut for mounting such a clearing device to the frame strut to form a clearing apparatus, and a guide handle extending from the upper end portion of the frame strut for use in guiding the support wheel during use;

the pivot mount having a pivot axis to extend substantially vertically during use to allow said elongated blower nozzle of such a mounted clearing device to be pivotally displaced for varying the angle between a clearing device plane of such a clearing device and the support wheel plane during use, the clearing device plane being a plane through an elongated axis of such an elongated blower nozzle and which extends substantially vertically during use when such a clearing device is mounted to the carriage;

the guide handle being positioned for an operator grasping the guide handle for guiding the support wheel during use, to be positioned to one side of the support wheel and at least partially in line with part of an axial projection of the support wheel during normal use;

the frame strut being shaped so that during use the pivot mount and the guide handle will be in advance of the wheel axis, and so that the guide handle, the pivot axis and the contact point of the support wheel with a support surface during use, will be generally in line during use; and the clearing device being adapted to be mounted to the frame strut so that when so mounted the clearing apparatus comprising the carriage and such a mounted clearing device will be supported proximate its center of gravity on the support wheel when the support wheel and such a mounted elongated blower nozzle are generally in line with each other during normal use.

43. A clearing apparatus according to claim 1, in which the clearing head is removably attached to the elongated support member to allow the clearing head to be removed from the apparatus.

44. A clearing apparatus according to claim 43, in which the clearing head has a clearing head portion of the elongated support member connected thereto, in which the clearing head portion is removably connected to the remainder of the elongated support member.

* * * * *